(12) United States Patent
Hancock

(10) Patent No.: US 6,264,240 B1
(45) Date of Patent: Jul. 24, 2001

(54) COLLAPSIBLE STEERING COLUMN FOR A VEHICLE

(75) Inventor: Michael Thomas Hancock, Coventry (GB)

(73) Assignee: Nastech Europe Limited, Conventry (GB)

( * ) Notice: Subject to any disclaimer, the term of this patent is extended or adjusted under 35 U.S.C. 154(b) by 0 days.

(21) Appl. No.: 09/429,249

(22) Filed: Oct. 29, 1999

(30) Foreign Application Priority Data

Nov. 24, 1998 (GB) .................................................. 9825761

(51) Int. Cl.[7] ........................................................ B62D 1/19
(52) U.S. Cl. ............................................................ 280/777
(58) Field of Search ............................................... 280/777

(56) References Cited

U.S. PATENT DOCUMENTS 5,609,364 * 3/1997 Fouquet et al. ....................... 280/777
5,961,146 * 10/1999 Matsumoto et al. .................. 280/777

FOREIGN PATENT DOCUMENTS

| 2268125A | 1/1994 | (GB) . |
| 2279623A | 1/1995 | (GB) . |
| 2291840A | 2/1996 | (GB) . |
| 2309204A | 7/1997 | (GB) . |
| 2326135A | 12/1998 | (GB) . |
| 2331964A | 6/1999 | (GB) . |

* cited by examiner

*Primary Examiner*—Kenneth R. Rice
(74) *Attorney, Agent, or Firm*—Miles & Stockbridge PC

(57) ABSTRACT

A collapsible steering column for a vehicle includes an energy absorption device in the form of a wire bent into a U-shape with a member attached to an outer tube of the column engaging the base of the "U" of the wire. The free arms of the wire are contained within two apertures of a steering column adjustment block, in which the outer tube is mounted, with the base of the wire lying outside of apertures of the block. Upon vehicle crash, the outer tube moves and the member presses on the base of the wire to draw the arms of the wire out of the two apertures and into a third aperture intermediate of the two. The wire is given different cross sectional profiles to meet specified energy absorption criteria.

23 Claims, 3 Drawing Sheets

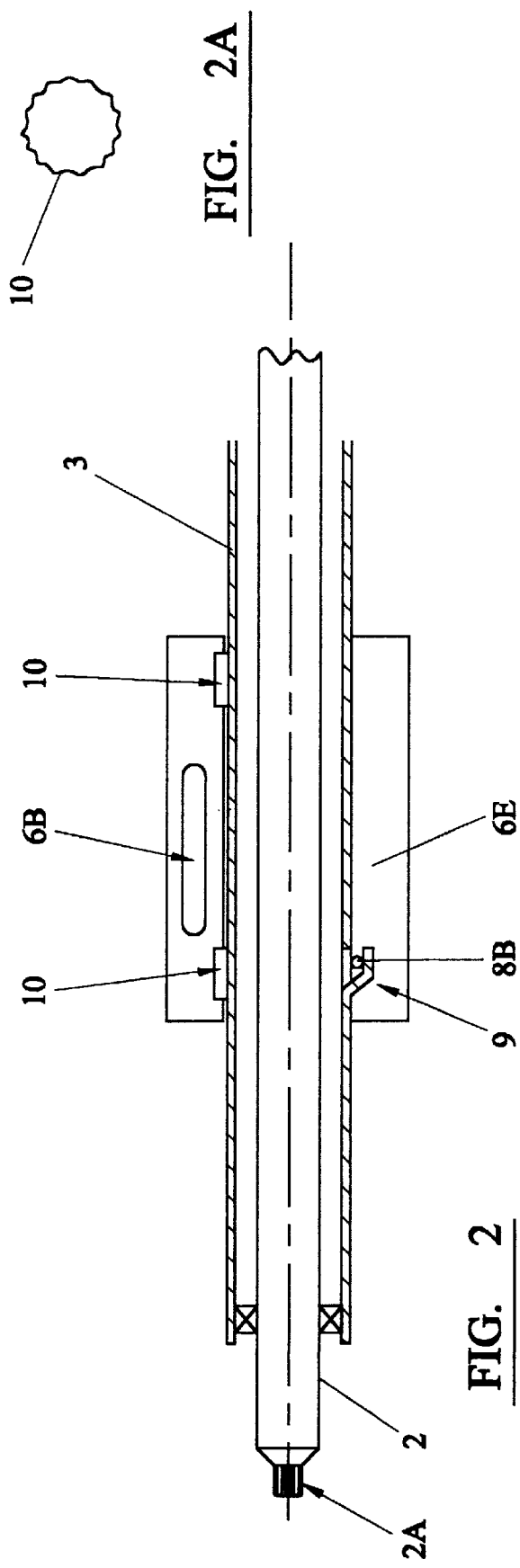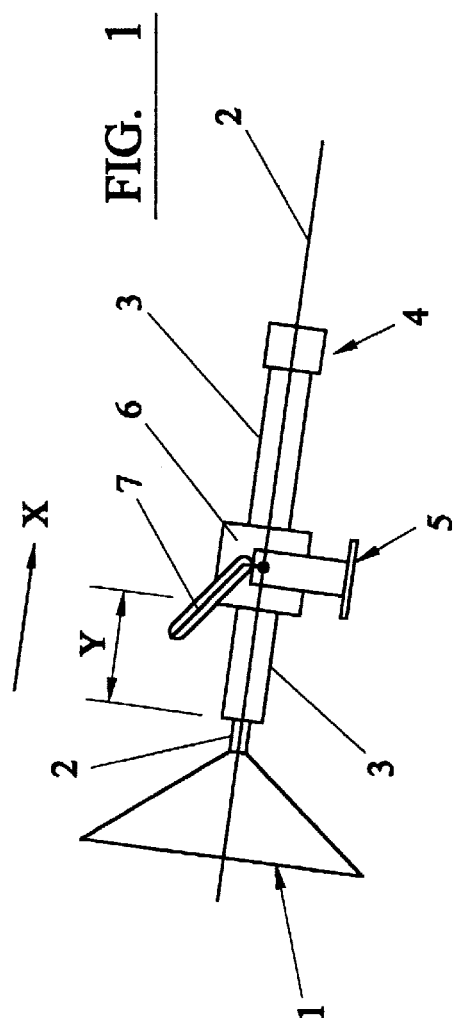

WIRE SECTION 'A' & 'B' OPTIONS

COLLAPSIBLE STEERING COLUMN FOR A VEHICLE

BACKGROUND OF THE INVENTION

This invention relates generally to collapsible steering columns for vehicles, and more particularly to an energy absorption device for dissipating force from a steering column to a driver in case of collision.

Requirements vary from place to place and from vehicle to vehicle as to the constraints to be applied to energy absorption systems incorporated in collapsible steering columns for vehicles. Hitherto, in addition to the difficulty of determining the required energy absorption for a given vehicle in a given country, it has been a problem to meet these requirements in a single device.

The foregoing illustrates limitations known to exist in present energy absorbing steering columns. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a collapsible steering column for a vehicle, the column incorporating an energy absorption device in the form of a first member and an elongate filament which is drawn over said first member upon steering column collapse, thereby to absorb energy, the filament having a cross section which has been profiled to meet specified energy absorption criteria.

The foregoing and other aspects will become apparent from the following detailed description of the invention when considered in conjunction with the accompanying drawings.

BRIEF DESCRIPTION OF THE DRAWINGS

FIG. 1 is a schematic side view of a vehicle steering column assembly;

FIG. 2 is an enlarged sectional side view of a detail of the assembly of FIG. 1;

FIG. 2a is a schematic view of components illustrated in FIG. 2;

DETAILED DESCRIPTION

Figures 3, 4:
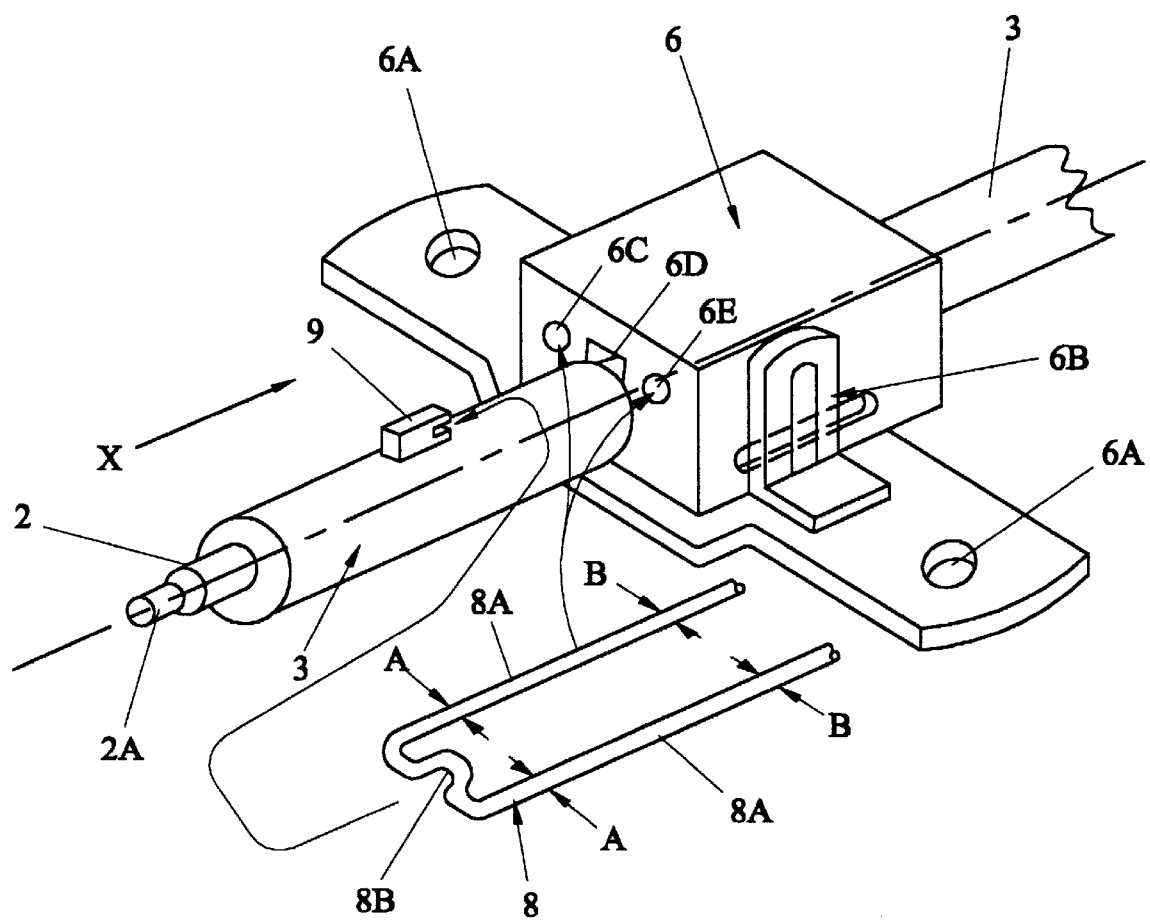
FIG. 3 is a schematic exploded perspective view of the detail shown in FIG. 2.
FIG. 4 illustrates a variety of cross-sections for the elongate filament.

FIG. 1 illustrates a vehicle steering column assembly having a steering wheel 1 mounted on an inner steering column shaft 2. The inner steering column shaft is mounted in a steering column outer tube 3, which is itself mounted to a lower mounting point 4 and to a cross car beam mounting point 5 via a steering column adjustment block 6. The steering column adjustment block includes a clamping handle 7.

Upon vehicle crash, the steering column collapses by force of the driver on the steering wheel in the general direction indicated by the arrow X (also visible in FIG. 3). The extent of the energy absorbing crash stroke provided by the present device is indicated by the double arrows Y shown in FIG. 1.

FIGS. 2 and 3 show a steering wheel mounting point 2A on the inner shaft 2. The outer tube 3 passes through the adjustment block 6 near mounting points 6A at which the block is mounted to the vehicle cross beam 5. The adjustment system is schematically illustrated at 6B. It will be appreciated that the view in FIG. 3 is as seen from the underside of the steering column and is an exploded view.

The energy absorption device is in the form of a wire 8 with two arms 8A which are passed into respective apertures 6C in the end face of the adjustment block 6 closest to the steering wheel end of the steering column. The base 8B of the U-shaped form of the wire 8 lies over the face of the adjustment block between the two apertures 6C. A third aperture 6D is provided intermediate and in line with the outer two apertures 6C and allows for passage of a wire retention member 9 provided on the outer surface of the outer tube 3. The wire retention member 9 can be in the form of a tab as illustrated in the assembled condition in FIG. 2 or can be welded on the outer tube 3 as shown in FIG. 3. Once assembled, the outer tube 3 passes through the adjustment block 6, and the wire retention member 9 is passed through the aperture 6D into a void 6E in the adjustment block 6 with the base 8B of the wire 8 engaged by the member 9, the arms 8A lying within the void 6E. Two corrugated rings 10 serve to retain the outer tube 3 in position in the adjustment block 6 in normal use. In the event of vehicle crash, the outer tube 3 passes through the block 6 at a controlled rate as dictated by the retention forces of the corrugated rings 10 and the wire type.

FIG. 4 illustrates various possible sections for the cross-sectional profile of the wire 8 as viewed at the points A-B and B-B in FIG. 3. These may include:

FIG. 4 (1) A+B=equal circular profile;

FIG. 4 (2) A+B=semi-circular+circular profile;

FIG. 4 (3) A+B=circular+semi-circular profile;

FIG. 4 (4) A+B=smaller diameter+larger diameter circular profile; and

FIG. 4 (5) A+B=larger diameter+smaller diameter circular profile.

Other profiles to achieve the claimed effect are also possible.

Figure 5:
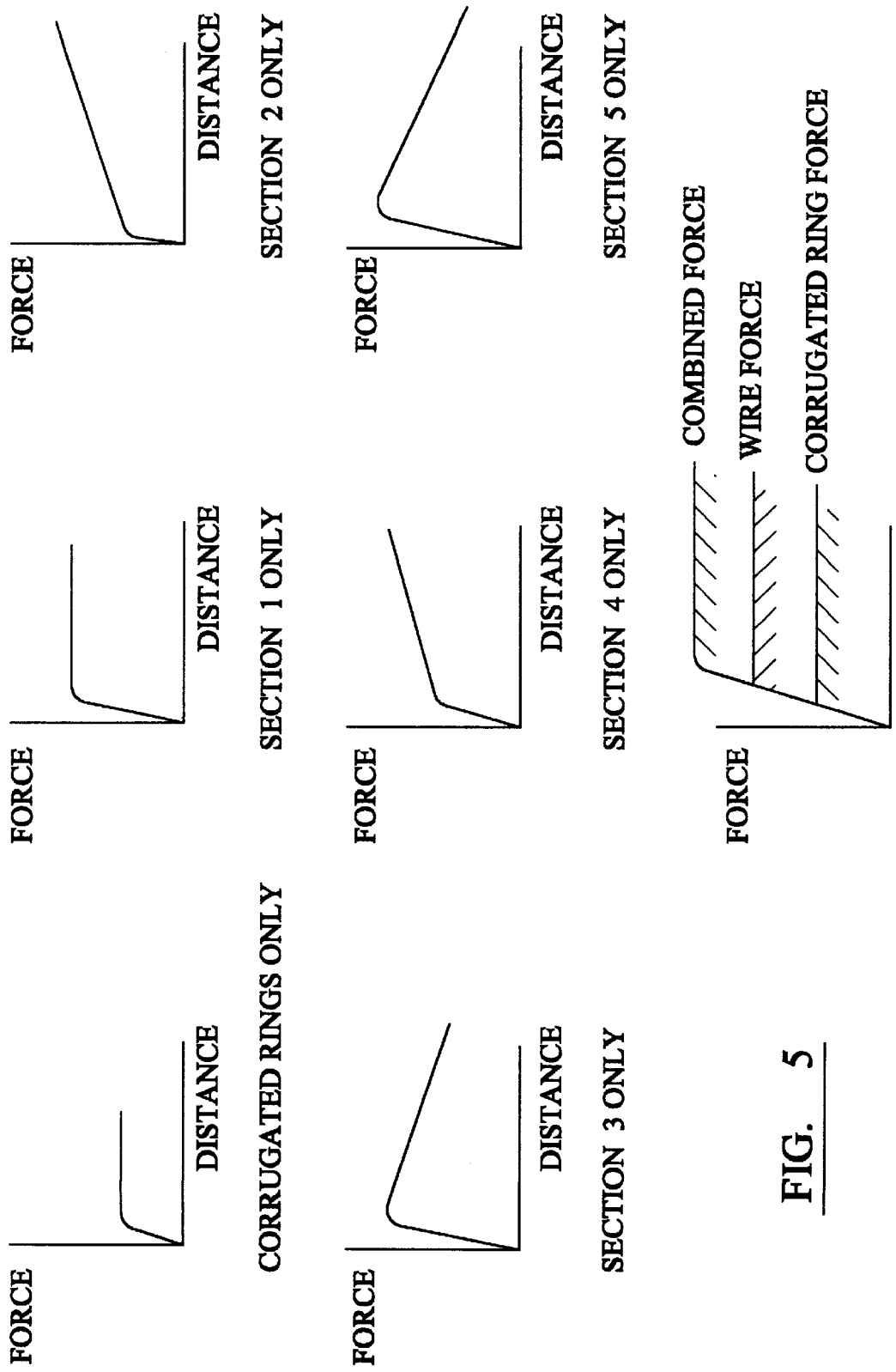
FIG. 5 illustrates various energy absorption curves for different filament (wire) types.

FIG. 5 schematically illustrate the various energy absorption curves for the different wire types, including the corrugated rings only, as an example, without the wire 8. The various curves for the five sections of wire, or wire types, are illustrated in FIG. 4, in terms of collapse force as a function of distance. The lowermost curve is simply to illustrate the combined force of the wire and corrugated ring forces.

In summary, a collapsible steering column for a vehicle, according to the invention, incorporates an energy absorption device in the form of a first member and an elongate filament which is drawn over said first member upon steering column collapse, thereby to absorb energy. The filament has a cross-section which has been profiled to meet specified energy absorption criteria. The elongate filament can be a wire which can be, for example, of steel or aluminum. The profiling of the filament is such as to tune the filament to give different energy absorption forces as required. The filament can be incorporated in a steering column adjustment apparatus and preferably is in the form of a wire bent into a substantially U-shaped form with longitudinal arms of the U-shape extending through respective apertures in a wall of an adjustment block of the adjustment apparatus, with the base of the "U" passing along the face of the adjustment block between the two apertures. A third aperture is spaced between and in line with the first two apertures so that a member mounted on an outer tube of the steering column can engage the base of the "U" of the filament and, in the event of vehicle crash, can act upon the base of the filament to urge it in a direction of steering column collapse thereby to draw the arms of the filament out of the first two apertures, over the face of the adjustment block, and into the intermediate aperture.

Another fixed member may be used for the appropriate purpose instead of the adjustment block and the aforesaid apertures.

Having described the invention, I claim:

1. A collapsible steering column for a vehicle, the column incorporating an energy absorption device, comprising:
   a first fixed member and a second collapsible member mounted thereto;
   an elongate filament having a cross section which has been profiled to meet specified energy absorption criteria; and
   a drawing member disposed on an outer tube of the steering column to draw said filament over said first fixed member upon steering column collapse, thereby to absorb energy,
   wherein the elongate filament is incorporated in a steering column adjustment apparatus,
   the filament comprises a wire bent in a substantially U-shaped form with longitudinal arms of the U-shape extending through respective apertures in a wall of a block of the adjustment apparatus, with the base of the "U" passing along a face of the adjustment block between the two apertures, and
   a third aperture in said adjustment block is spaced between and in line with the first two apertures so that said drawing member engages the base of the "U" of the wire and acts upon the base of the wire to urge it in a direction of steering column collapse in the event of a vehicle crash, thereby to draw the arms of the wire out of the first two apertures and over the face of the adjustment block and into the third intermediate aperture.

2. A collapsible steering column according to claim 1, wherein the wire is of steel or aluminum.

3. A collapsible steering column according to claim 1, wherein the filament has two different profiles along its length.

4. The collapsible steering column according to claim 1, wherein at least one of said base of the wire and said drawing member defines a notch that receives the other.

5. The collapsible steering column according to claim 1, wherein said base of the wire and said drawing member define respective notches that engage each other.

6. The collapsible steering column according to claim 1, wherein said outer steering column tube is supported to the adjustment block by a plurality of corrugated members spaced axially of said outer steering column tube.

7. The collapsible steering column according to claim 6, wherein said corrugated members are ring members.

8. A collapsible steering column for a vehicle, comprising:
   an outer steering column tube mounted in a steering column adjustment block;
   an elongate filament in the form of a U-shaped wire with longitudinal arms of the U-shape extending through two respective apertures in a wall of said adjustment block, with the base of the "U" passing along a face of the adjustment block between the two apertures and across a third aperture spaced between an in line with the first two apertures;
   a drawing member disposed on said outer steering column tube to engage the base of the "U" of the wire and act upon the base of the wire to urge it in a direction of steering column collapse in the event of a vehicle crash, thereby to draw the arms of the filament out of the first two apertures, over the face of the adjustment block, and into the third intermediate aperture.

9. The collapsible steering column according to claim 8, wherein the filament has two different cross-section profiles along its length.

10. The collapsible steering column according to claim 8, wherein the drawing member comprises a wire retention member integrally formed on said tube.

11. The collapsible steering column according to claim 8, wherein the drawing member comprises a wire retention member welded to said tube.

12. The collapsible steering column according to claim 8, wherein at least one of said base of the wire and said drawing member defines a notch that receives the other.

13. The collapsible steering column according to claim 8, wherein said base of the wire and said drawing member define respective notches that engage each other.

14. The collapsible steering column according to claim 8, wherein said outer steering column tube is supported to the adjustment block by a plurality of corrugated members spaced axially of said outer steering column tube.

15. The collapsible steering column according to claim 14, wherein said corrugated members are ring members.

16. A collapsible steering column for a vehicle, the column incorporating an energy absorption device, comprising:
   a mounting member having a collapsible steering column tube mounted thereto;
   an elongate filament comprising a wire bent in a substantially U-shaped form with longitudinal arms of the U-shape extending through respective apertures in a wall of said mounting member, with the base of the "U" passing along a face of the wall between the two apertures; and
   a drawing member provided on said steering column tube,
   wherein a third aperture in said wall of the mounting member is disposed between the first two apertures so that said drawing member engages the base of the "U" of the wire and acts upon the base of the wire to urge it in a direction of steering column collapse in the event of vehicle crash, thereby to draw the arms of the wire out of the first two apertures and over said face of the wall and into the third aperture.

17. The collapsible steering column according to claim 16, wherein said mounting member incorporated in a steering column adjustment apparatus.

18. The collapsible steering column according to claim 17, wherein said mounting member is a steering column adjustment block.

19. The collapsible steering column according to claim 18, wherein said steering column tube is supported to said adjustment block by a plurality of corrugated members spaced axially of said steering column tube.

20. The collapsible steering column according to claim 19, wherein said corrugated members are ring members.

21. The collapsible steering column according to claim 16, wherein at least one of said base of the wire and said drawing member defines a notch that receives the other.

22. The collapsible steering column according to claim 16, wherein said base of the wire and said drawing member define respective notches that engage each other.

23. The collapsible steering column according to claim 16, wherein said third aperture is in line with the first two apertures.

* * * * *